United States Patent [19]

Joseph

[11] 4,407,576
[45] Oct. 4, 1983

[54] SYNCHRONIZING MECHANISM FOR FLASH FIRING AND SHUTTER OPERATION

[75] Inventor: Brian J. Joseph, Rochester, N.Y.

[73] Assignee: Eastman Kodak Company, Rochester, N.Y.

[21] Appl. No.: 337,928

[22] Filed: Jan. 8, 1982

[51] Int. Cl.³ .................................................. G03B 15/03
[52] U.S. Cl. ....................................................... 354/135
[58] Field of Search .................................... 354/135, 142

[56] References Cited

U.S. PATENT DOCUMENTS

| | | | |
|---|---|---|---|
| 1,954,673 | 4/1934 | Krupnick et al. | 354/147 |
| 3,640,196 | 2/1972 | Brooks . | |
| 3,677,153 | 7/1972 | Bok | 354/135 |
| 3,699,860 | 10/1972 | Winkler | 354/135 X |
| 3,706,268 | 12/1972 | Engelsmann et al. | 354/237 |
| 3,958,259 | 5/1976 | Genesky | 354/135 |
| 4,052,730 | 10/1977 | Hochreiter et al. | 354/135 |
| 4,183,648 | 1/1980 | Harvey et al. | 354/135 |

FOREIGN PATENT DOCUMENTS 2021401 11/1971 Fed. Rep. of Germany ...... 354/135

Primary Examiner—John Gonzales
Attorney, Agent, or Firm—Roger A. Fields

[57] ABSTRACT

In a camera, a piezoelectric generator is struck by a hammer to produce an electrical pulse for flash firing. A firing spring carrying the hammer engages a shutter blade to drive the blade as the spring is moved to impact the hammer against the crystal. When the firing spring is stopped by the hammer striking the crystal, the shutter blade is catapulted from the firing spring to uncover an exposure aperture in synchronization with the resulting flash illumination.

4 Claims, 4 Drawing Figures

SYNCHRONIZING MECHANISM FOR FLASH FIRING AND SHUTTER OPERATION

BACKGROUND OF THE INVENTION

1. Field of the Invention

The invention relates generally to photographic apparatus, and more particularly to a synchronizing mechanism for flash firing and shutter operation in a camera.

2. Description of the Prior Art

It is well known in the photographic arts to fire a flash lamp by means of an electrical pulse generated by a piezoelectric crystal and to provide a mechanism for synchronizing such flash firing with the shutter operation of a camera. For the most part, known synchronizing mechanisms for flash firing and shutter operation have tended to be mechanically complex. For example, as disclosed in U.S. Pat. No. 3,697,142, granted June 6, 1975, a firing spring is unlatched to cause a hammer on the spring to strike a piezoelectric crystal, activating the crystal to generate an electrical pulse for flash firing. In timed relationship, a high energy lever is unlatched to actuate a shutter blade for initiating a film exposure. The shutter begins to open after the piezoelectric crystal is struck, to allow for the inherent delay between striking the crystal and peak illumination of the flash. Full opening of the shutter is reached substantially concurrent with peak illumination. While such a synchronizing mechanism has been generally accepted, the use of separate devices for activating the piezoelectric crystal and for operating the shutter gives rise to reliability problems and increases the manufacturing and assembly costs of a camera.

Other known, less complex, mechanisms for synchronizing flash firing and shutter operation can have different problems. For example, in U.S. Pat. No. 3,677,153, granted July 18, 1976, although simplification is achieved by using the shutter blade as a hammer for striking the piezoelectric crystal, the blade strikes the crystal after uncovering the exposure aperture. Consequently, there is no coincidence between peak illumination of the flash and full opening of the shutter. Instead, peak illumination is reached as the blade re-covers the aperture. Another problem may arise from camera shake caused by the impact of the blade against the crystal. Since this shake occurs before the blade re-covers the aperture, the film image of the object being photographed may be smeared, causing an attendant loss of resolution in a developed print.

Another simplified syncrhonizing mechanism, in Ger. Ols. No. 2,021,401, published Nov. 11, 1971, includes a striker arm and a shutter actuating arm which are held in respective adjacent cocked positions by a common latch. When simultaneously released, the arms are urged by separate springs to strike the piezoelectric generator and a shutter blade. Although this design is simplified by the use of a common latch, it requires separate arms and springs, which may cause variations in the timed relationship between flash firing and shutter operation from camera to camera, especially in mass production.

SUMMARY OF THE INVENTION

The previously described problems associated with known synchronizing mechanisms for flash firing and shutter operation are believed solved by the invention. For example, the invention is a much simplified synchronizing mechanism which has fewer component parts, improves reliability, and can be inexpensively manufactured and assembled. These results are achieved in accordance with the invention by providing in a photographic camera of the type wherein (a) a piezoelectric generator is struck to produce an electrical pulse for flash firing, (b) a striker is movable to strike the generator, and (c) a shutter member is operable to initiate a film exposure in synchronization with flash firing, the improvement comprising:

means, adapted to releasably engage the striker with the shutter member, for causing the shutter member to be catapulted by the striker upon the striker striking the piezoelectric generator, whereby the shutter member is operated to initiate a film exposure.

According to a preferred embodiment of the invention, a firing spring having a hammer for striking a piezoelectric crystal is coupled with a shutter blade to move the blade with the spring as the spring is moved to impact the hammer against the crystal. When the firing spring is stopped upon the hammer striking the crystal, the shutter blade is catapulted from the spring to uncover an exposure aperture in synchronization with flash firing. Because such shutter actuation is obtained by using the energy of the firing spring, the need for a separate device for operating the shutter, as in some prior art synchronizing mechanisms, is dispensed with. Moreover, because the shutter is operated upon activating the crystal, it is relatively simple to coordinate peak illumination of the flash and full opening of the shutter. This improvement, therefore, reduces manufacturing and assembly costs of a camera and enhances the reliability of the synchronizing mechanism.

DESCRIPTION OF THE PREFERRED EMBODIMENT

The invention is described as being embodied in a still picture camera usable with a chemical type flash. Because such cameras are well known, this description will be directed in particular to apparatus forming part of or cooperating directly with the preferred embodiment. It is to be understood, however, that camera elements not specifically shown or described may take various forms known to persons of ordinary skill in the camera art.

Figure 1:
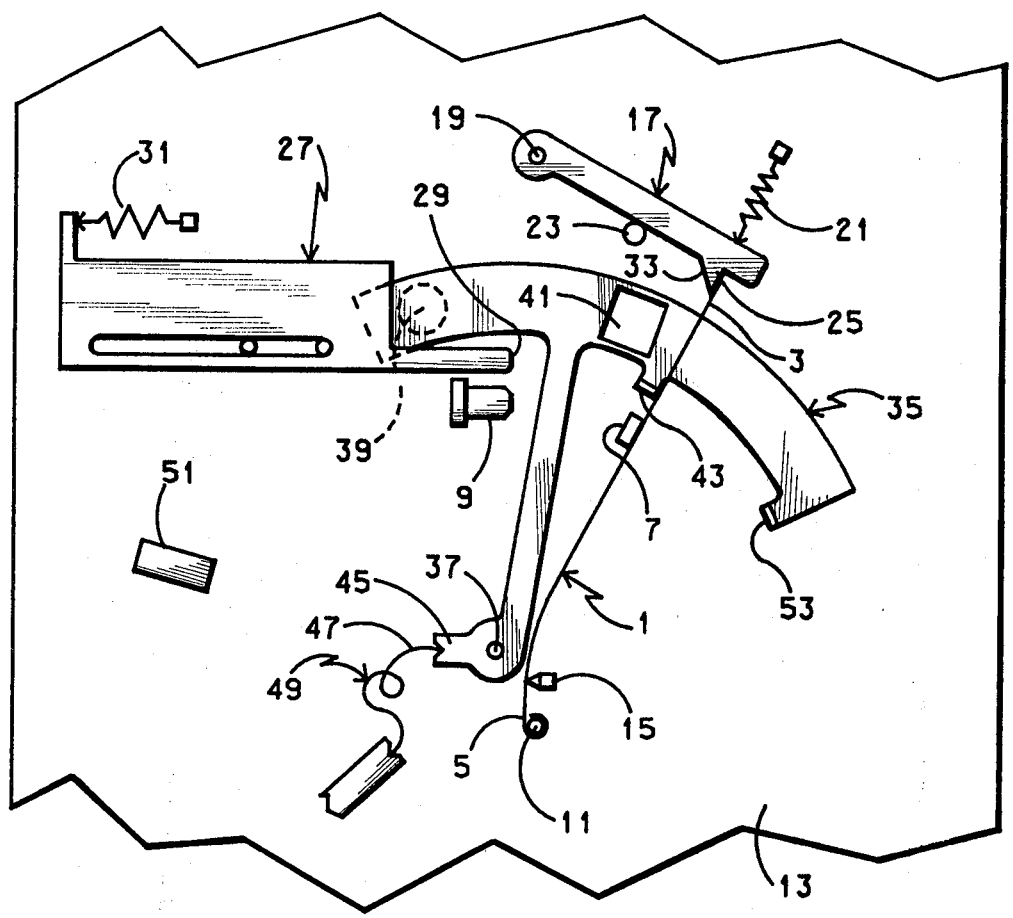
FIG. 1 is an elevation view of a synchronizing mechanism for flash firing and shutter operation in accordance with a preferred embodiment of the invention, and shows the mechanism in an initial or cocked state ready for picture-taking.

Referring now to the drawings, there is shown a synchronizing mechanism for flash firing and shutter operation in a still picture camera. In FIG. 1, a firing spring 1 is illustrated in the form of a cantilevered beam having opposite end portions 3 and 5. Intermediate the end portions 3 and 5, a hammer 7 is secured on the firing spring to strike a piezoelectric crystal 9. When struck by the hammer 7, the piezoelectric crystal 9 produces an electrical pulse for flash firing. The firing spring 1 is anchored at its end portion 5 by a mounting pin 11 fixed to a camera plate 13, and is intended to be flexed about a fulcrum 15 on the camera plate, proximate the end portion 5, in FIG. 1.

A firing spring latch 17 is pivotally movable about a mounting pin 19 fixed to the camera plate 13. The latch 17 is biased by a compression spring 21 to pivot in a clockwise direction, as viewed in FIG. 1, against a stop pin 23. When the latch 17 is located against the stop pin 23, a toothed portion 25 of the latch is disposed to engage the end portion 3 of the firing spring 1 and, thereby, releasably retain the firing spring in a latched or cocked position flexed about the fulcrum 15. When the firing spring 1 is released by the latch 17, as depicted in FIG. 2, by means not shown, the firing spring swings in a counter-clockwise direction to a firing or impacting position; whereupon, the hammer 7 strikes the piezoelectric crystal 9 to produce an electrical pulse for flash firing.

Figure 2:
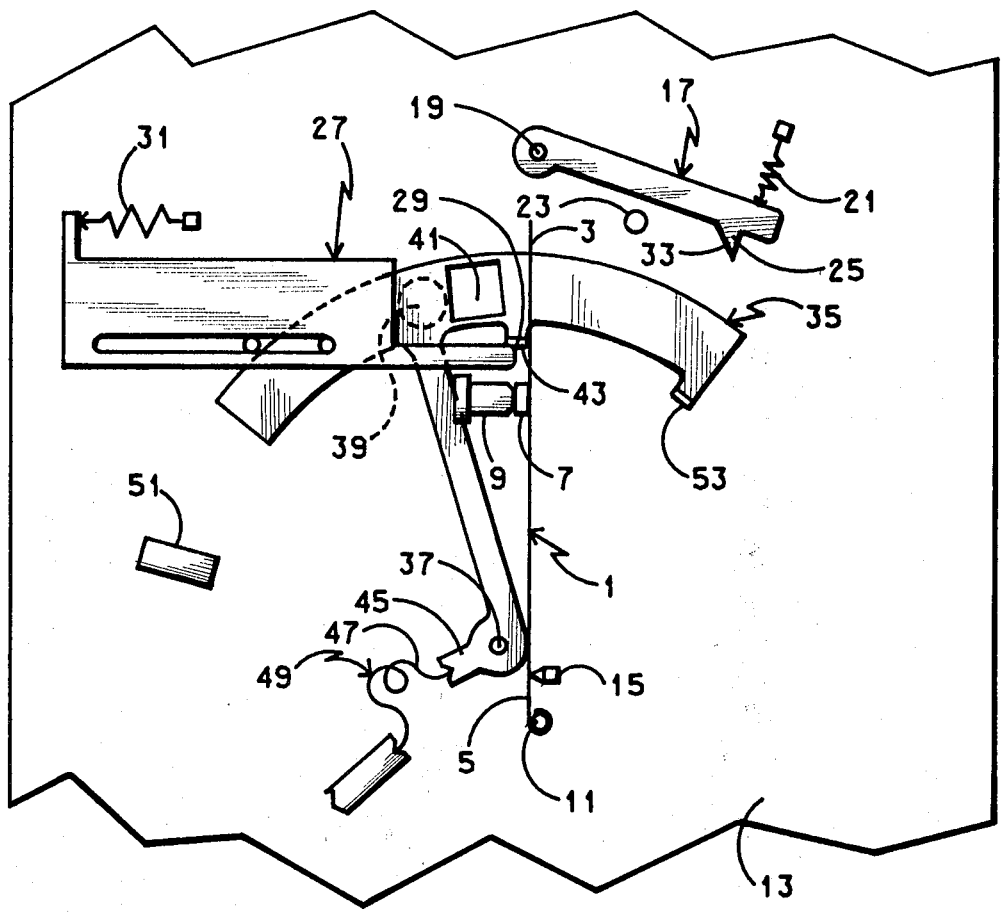
FIG. 2 is an elevation view of the synchronizing mechanism, which shows the mechanism in an intermediate state in which a hammer on a firing spring impacts against a piezoelectric crystal and a shutter blade is catapulted from the firing spring to uncover an exposure aperture in synchronization with the resulting flash illumination.
Figure 3:
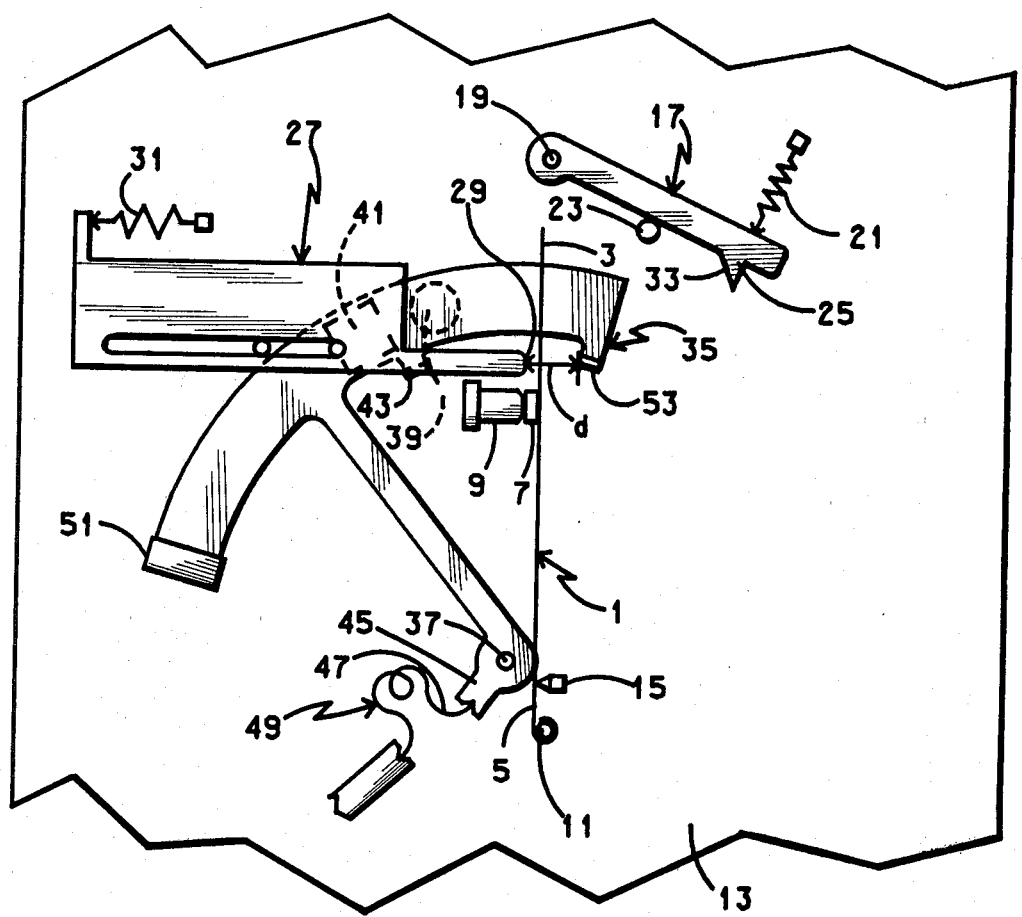
FIG. 3 is an elevation view of the synchronizing mechanism, which shows the mechanism in a final state after film exposure and flash firing are completed.
Figure 4:
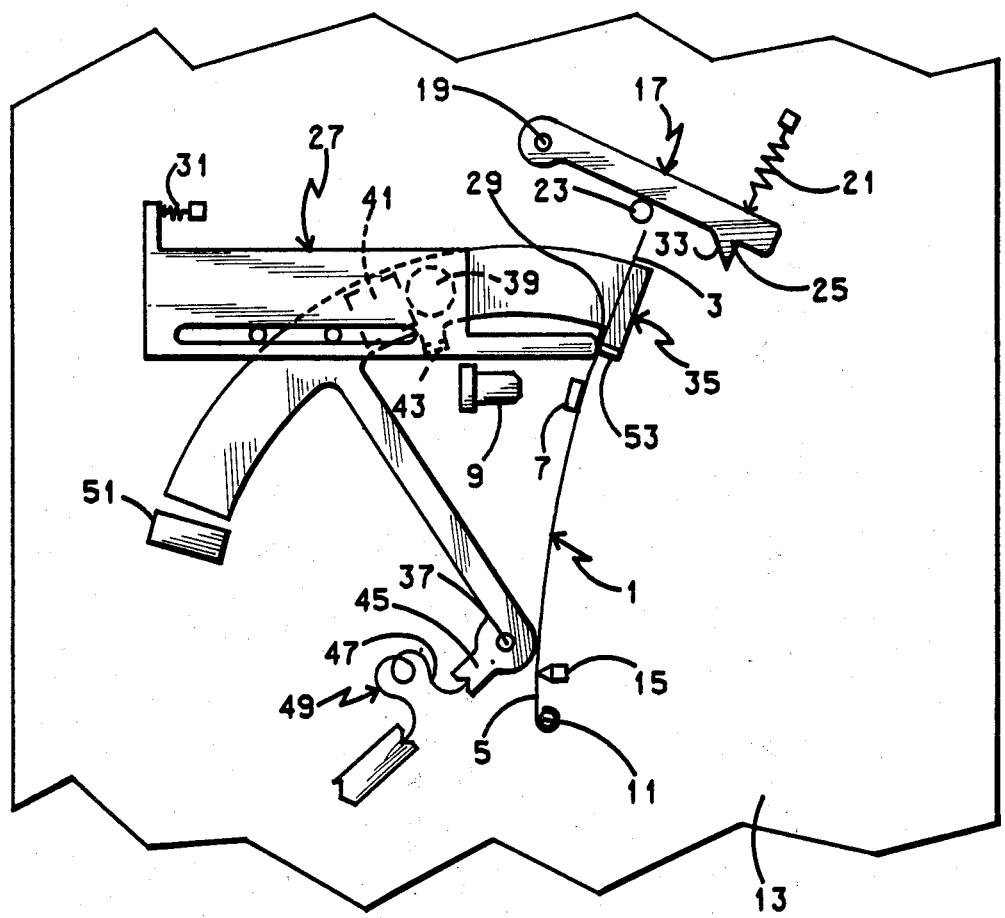
FIG. 4 is an elevation view of the synchronizing mechanism, which shows the mechanism being returned to its initial or cocked state.

A cocking slide 27 has a leading finger 29 located to flex the firing spring 1 in a clockwise direction, in FIGS. 2-4, away from the crystal 9 as the cocking slide is moved to the right, contrary to the urging of a return spring 31. When the end portion 3 of the firing spring 1 is moved against an inclined edge 33 of the toothed portion 25 of the latch 17, the end portion operates as a cam to pivot the toothed portion momentarily out of its way. This permits the end portion 3 to swing by the toothed portion 25 for return of the firing spring 1 to its latched position, shown in FIG. 1.

A shutter blade 35 is pivotally movable about a mounting pin 37 fixed to the camera plate 13. The blade 35 is pivoted for movement between an original closed position, shown in FIG. 1, in which the blade covers an exposure aperture 39; an opened position, not shown, in which a slot 41 in the blade passes over the exposure aperture to effect a film exposure; and a final closed position, shown in FIG. 3, in which the blade covers the exposure aperture. In the original closed position, an actuating tab 43 on the shutter blade 35 contacts the firing spring 1. This engagement between the shutter blade 35 and the firing spring 1 causes the firing spring to drive the shutter blade in a counter-clockwise direction, in FIGS. 1 and 2, from its original closed position as the firing spring is swung to impact the hammer 7 against the crystal 9. When the firing spring is abruptly stopped by the hammer striking the crystal, the shutter blade is catapulted from the firing spring and pivots through its opened position to effect a film exposure in synchronization with the flash illumination. Because such shutter actuation is obtained by using the energy of the firing spring, the need for a separate device for operating the shutter, as in some prior art synchronizing mechanisms, is dispensed with.

A finger 45 on the shutter blade 35 is connected to one leg 47 of an over-center or toggle spring 49. The over-center spring 49 operates in a first mode to bias the shutter blade 35 to its original closed position, shown in FIG. 1. In effect, the over-center spring 49 in its first mode urges the actuating tab 43 on the shutter blade 35 against the firing spring 1 to, thereby, couple the shutter blade and the firing spring for movement of the blade by the firing spring in a counter-clockwise direction, in FIG. 1. After the shutter blade 35 is catapulted from the firing spring 1 and the blade pivots through its opened position, the over-center spring 49 changes from its first mode to a second mode. In the second mode, shown in FIG. 3, the over-center spring 49 operates to bias the shutter blade 35 to its final closed position against a shutter stop 51.

To return the shutter blade 35 to its original closed position, the blade is pivoted in a clockwise direction, in FIG. 4, from its final closed position. Initially, the shutter blade 35 is pivoted by movement of the firing spring 1 against a return tab 53 on the blade as the leading finger 29 of the cocking slide 27 pushes the firing spring towards its latched position. However, shortly before the shutter blade 35 is pivoted to its opened position, the over-center spring 49 changes from its second mode to its first mode to move the return tab 53 ahead of the firing spring 1 and to urge the actuating tab 43 against the firing spring; whereupon, the shutter blade will be returned to its original closed position by the over-center spring as the firing spring is returned to its latched position by the cocking slide.

In FIG. 3, the leading finger 29 of the cocking slide 27 is shown spaced a distance d from the return tab 53 of the shutter blade 35. This distance d allows the cocking slide 27 to cover the exposure aperture 39 before the shutter blade 35 is moved out of its final closed position, thereby preventing the exposure aperture from being uncovered as the shutter blade is returned through its opened position.

Known means, not shown, may be included in the camera for varying the exposure time. For example, several exposure times can be obtained by changing either the location of the fulcrum 15 or the latched position of the firing spring 1, in order to produce a corresponding change in the velocity of the shutter blade 35 as the shutter slot 41 passes over the exposure aperture 39.

The invention has been described in detail with reference to a particular embodiment thereof, but it will be understood that variations and modifications can be effected within the spirit and scope of the invention.

I claim:

1. In a photographic camera of the type wherein (a) a piezoelectric generator is struck to produce an electrical pulse for flash firing, (c) a striker is movable to strike said generator, and a shutter member is operable to initiate a film exposure in synchronization with flash firing, the improvement comprising:

means, adapted to releasably engage said striker with said shutter member, for moving said shutter member with said striker and for allowing said shutter member to be catapulted from said striker upon the striker striking said piezoelectric generator, whereby said shutter member is operated to initiate a film exposure.

2. In a photographic camera of the type wherein (a) piezoelectric generator is struck to produce an electrical pulse for flash firing, (b) a striker is movable to strike said generator, and (c) a shutter member is operable to initiate a film exposure in synchronization with flash firing, the improvement comprising:

means supporting said shutter member for movement with said striker; and means for engaging said striker with said shutter member as the striker is moved toward said piezoelectric generator, to impart the motion of said striker to said shutter member, and permitting said shutter member to disengage from said striker upon the striker striking said generator, to cause said shutter member to be catapulted by said striker, whereby said shutter member is operated to initiate a film exposure.

3. In a photographic camera of the type wherein (a) a piezoelectric generator is struck to produce an electrical pulse for flash firing, (b) a striker is movable to strike said generator, and (c) a shutter blade uncovers an exposure aperture to initiate a film exposure in synchronization with flash firing, the improvement comprising:

means supporting said shutter blade for movement with said striker until the striker strikes said piezoelectric generator and for movement from said striker to uncover said exposure aperture; and means for holding said shutter blade in contact with said striker to cause the striker to drive the shutter blade as said striker is moved to strike said piezoelectric generator, and permitting said shutter blade to be moved from said striker by its own momentum upon the striker striking said generator.

4. The improvement as recited in claim 3, wherein said holding means includes spring means for urging said shutter blade against said striker.

* * * * *

UNITED STATES PATENT OFFICE
CERTIFICATE OF CORRECTION

PATENT NO. : 4,407,576
DATED : October 4, 1983
INVENTOR(S) : Brian J. Joseph

It is certified that error appears in the above-identified patent and that said Letters Patent are hereby corrected as shown below:

Column 2, line 11, insert --moving the shutter member with the striker and-- after "for".

Column 4, line 47, "(c)" should read --(b)--.

Column 4, line 48, insert --(c)-- after "and".

Column 4, line 59, insert --a-- before "piezoelectric".

Signed and Sealed this

Twenty-fourth Day of January 1984

[SEAL]

Attest:

GERALD J. MOSSINGHOFF

Attesting Officer   Commissioner of Patents and Trademarks